United States Patent
Lopez Rodriguez et al.

(10) Patent No.: US 10,418,806 B2
(45) Date of Patent: Sep. 17, 2019

(54) SAFETY PROTECTION CIRCUIT

(71) Applicant: HEWLETT-PACKARD DEVELOPMENT COMPANY, L.P., Houston, TX (US)

(72) Inventors: Juan Luis Lopez Rodriguez, Subirats (ES); David Soriano Fosas, Vancouver, WA (US); Marc Soler Jauma, Cabrils (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 6 days.

(21) Appl. No.: 15/546,271

(22) PCT Filed: Mar. 10, 2015

(86) PCT No.: PCT/EP2015/054956
§ 371 (c)(1),
(2) Date: Jul. 25, 2017

(87) PCT Pub. No.: WO2016/141974
PCT Pub. Date: Sep. 15, 2016

(65) Prior Publication Data
US 2018/0026439 A1    Jan. 25, 2018

(51) Int. Cl.
| H02H 11/00 | (2006.01) |
| H02H 9/04 | (2006.01) |
| G05B 9/02 | (2006.01) |
| H02H 3/02 | (2006.01) |
| H02H 9/00 | (2006.01) |

(52) U.S. Cl.
CPC ............. *H02H 9/041* (2013.01); *G05B 9/02* (2013.01); *H02H 3/023* (2013.01); *H02H 9/008* (2013.01); *H02H 9/043* (2013.01)

(58) Field of Classification Search
None
See application file for complete search history.

(56) References Cited

U.S. PATENT DOCUMENTS

| 428,255 A | 5/1890 | Ross et al. |
| 5,846,099 A | 12/1998 | Hiruma et al. |

(Continued)

FOREIGN PATENT DOCUMENTS

| DE | 102006003620 A1 | 8/2007 |
| DE | 102006054354 A1 | 5/2008 |

(Continued)

OTHER PUBLICATIONS

Chowdhuri, P. et al., "Surge Protection of Low-Voltage D-C Circuits", Electrical Engineering, vol. 80, Issue:5, pp. 332-337, Feb. 12, 2013.

*Primary Examiner* — Lincoln D Donovan
*Assistant Examiner* — Khareem E Almo
(74) *Attorney, Agent, or Firm* — HP Inc. Patent Department

(57) ABSTRACT

A safety protection circuit is described, comprising a fuse, a first voltage detection circuit, a first Silicon-Controlled Rectifier, SCR, wherein the first SCR is triggered upon detection of a threshold voltage by the first voltage detection circuit, a second voltage detection circuit, and a second SCR, wherein the second SCR is triggered upon detection of a threshold voltage by the second voltage detection circuit.

10 Claims, 2 Drawing Sheets

(56) References Cited

U.S. PATENT DOCUMENTS

| | | | |
|---|---|---|---|
| 6,803,633 B2* | 10/2004 | Mergens | H01L 27/0292 |
| | | | 257/173 |
| 7,400,476 B1 | 7/2008 | Hull | |
| 2006/0291118 A1 | 12/2006 | Chen | |
| 2013/0268812 A1* | 10/2013 | Liu | G05B 13/02 |
| | | | 714/57 |
| 2014/0167099 A1* | 6/2014 | Mergens | H01L 27/0262 |
| | | | 257/109 |
| 2014/0268451 A1* | 9/2014 | Van Wijmeersch | |
| | | | H01L 27/0262 |
| | | | 361/56 |
| 2016/0285255 A1* | 9/2016 | O'Donnell | H02H 9/02 |

FOREIGN PATENT DOCUMENTS

| | | | |
|---|---|---|---|
| GB | 1412036 A | 10/1975 | |
| WO | WO-2014135351 A1 | 9/2014 | |

\* cited by examiner

SAFETY PROTECTION CIRCUIT

BACKGROUND

Human accessible areas of electronic circuitry are subject to stringent safety requirements and regulations. One way to meet these safety regulations is for the human-accessible areas to be constructed as Safety Extra Low Voltage (SELV) areas. As defined under the current IEC regulations, these SELV circuits would be expected to be safe under both normal and single fault conditions.

On some occasions, the electrical power supplies for the SELV area may be supplied via a high voltage area, for example, from the mains electrical power supply. Therefore, it is desirable to be able to transfer power from this unsafe, high voltage area to the SELV area. This may be done by providing circuitry from the mains to the SELV area which is fault tolerant, in order to provide safety protection in case of a fault causing a high voltage event along the power supply line from the high voltage area to the SELV area.

BRIEF INTRODUCTION OF THE DRAWINGS

Figure 1:
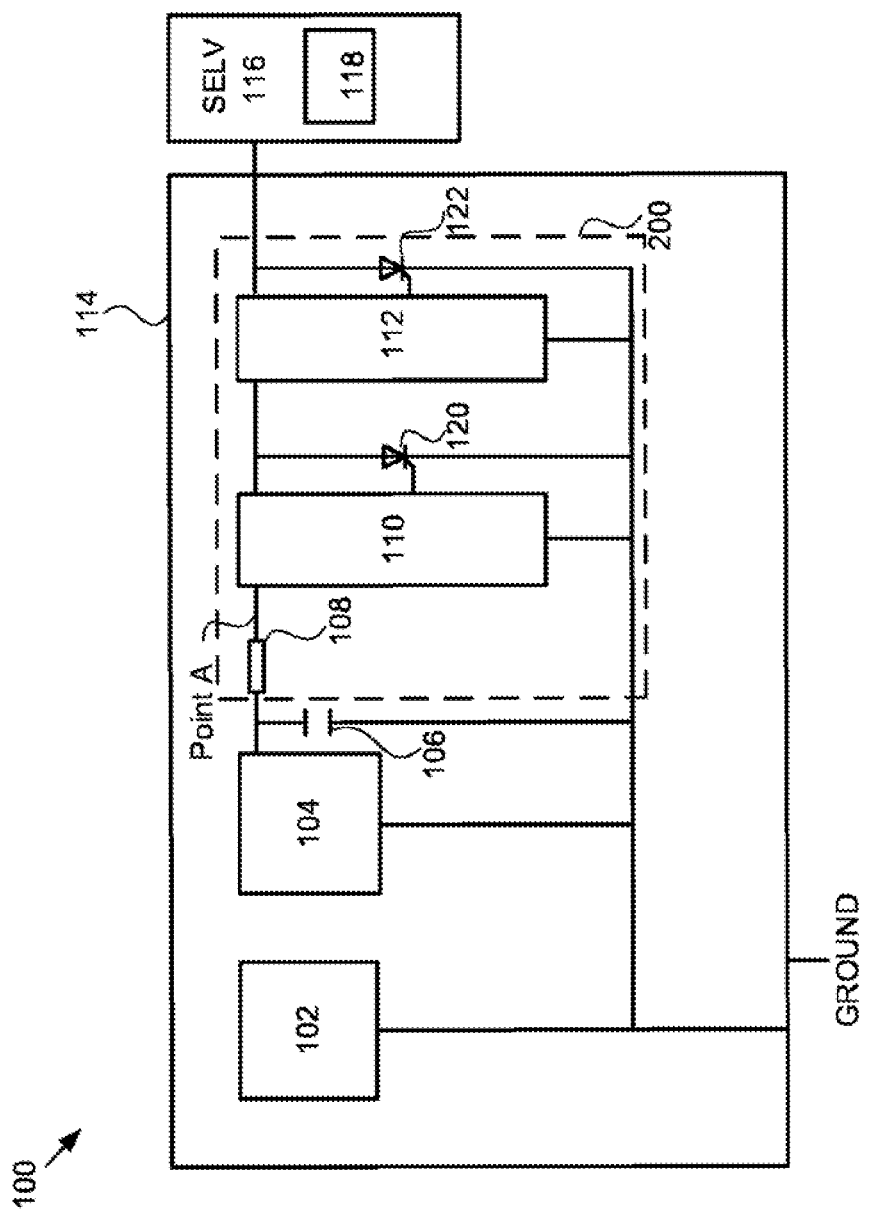
Figure 2:
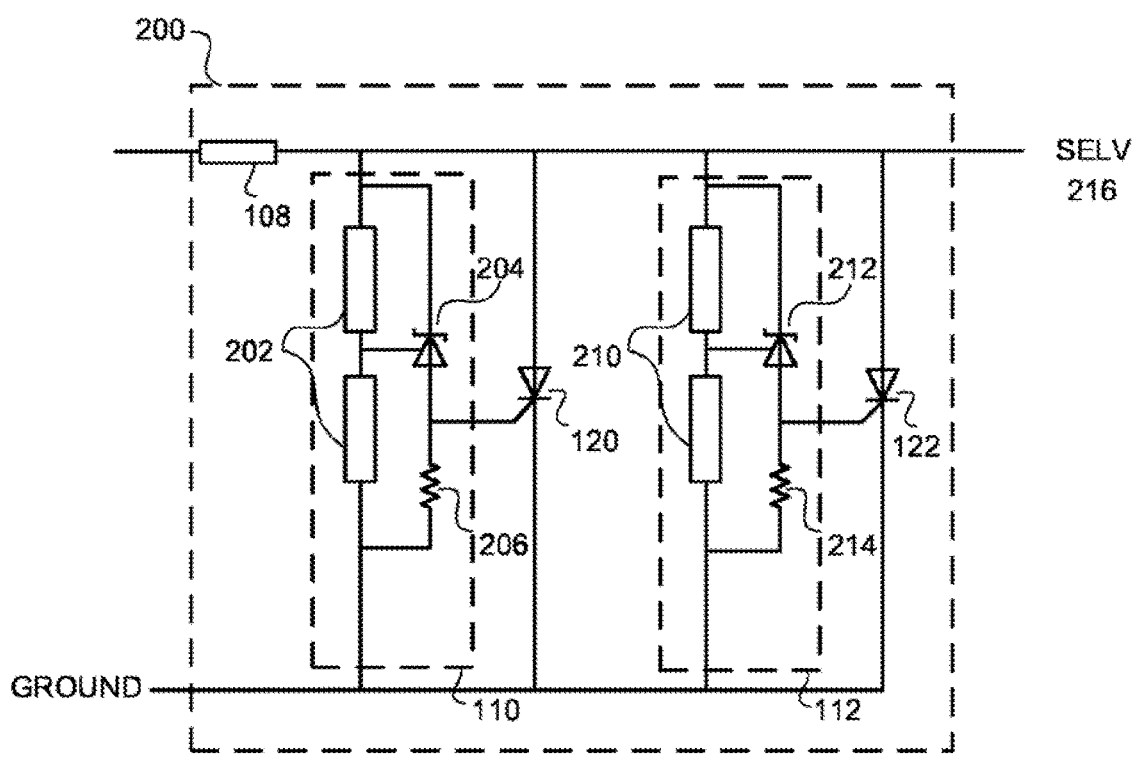

Examples of the present disclosure are further described hereinafter by way of example only with reference to the accompanying drawings, in which:

FIG. 1 illustrates an example system comprising a safety protection device circuit; and FIG. 2 illustrates example voltage detection circuits of the safety protection device circuit.

DETAILED DESCRIPTION OF AN EXAMPLE

Examples of the disclosure provide a fault tolerant safety protection circuit, which is supplied with power via a high voltage system. In particular, some examples of the disclosure provide a fault tolerant safety protection system which complies with IEC safety regulations.

Most current industry solutions use galvanic isolation to meet the safety requirements for transmitting electrical power between a hazardous area, containing high voltage circuitry, and a Safety Extra Low Voltage (SELV) area, containing low voltage circuitry. Galvanic isolation, using an isolation transformer, can be found in nearly all the domestic power supplies; for example, including computers, printers or DVD players. Within these power supplies, the isolation transformer acts as a physical separation between a primary circuit and a secondary circuit.

Therefore, in many solutions, a galvanic isolation transformer is used to physically separate high voltage circuits at a primary side, and low voltage circuits at a secondary side. As such, there is no physical, wired connection between the high and low voltage circuitry.

Additionally, in some applications, there may be high voltage circuitry running at the secondary side. Within such high voltage circuits, although the input and output voltages may be at a safe level; internally they work at high voltages. One such example is a High Voltage Energy Storage System (HVES). As the high voltage circuits are located at the secondary side, safety protection is provided in the event of contact between any node of the circuit and ground. However, such high voltage circuits are not safe in the event of contact between two nodes. Therefore, to provide such safety protection, the internal nodes working at high voltage on the secondary side would be expected to provide the same level of fault protection as though they were connected on the primary side.

As the input and output nodes in such circuits work at low voltages they are initially safe, but in the event of a single fault, they can be connected to nodes working at high voltages and become hazardous. Therefore, a solution for providing single-fault protection in such circuits is to apply double galvanic isolation between the internal nodes and any input or output node of the high voltage circuitry. However, the use of such transformers to provide the regulatory safety protection may result in significantly increased costs.

FIG. 1 describes an overview of an example system 100. Within the system 100, a high voltage system 102 is provided. The high voltage system 102 represents any circuit having high voltage nodes. The high voltage system 102 is coupled to a first terminal of a low voltage power supply 104. The low voltage power system 104 represents any enclosed circuit designed to convert high voltages to low voltages within an enclosure, wherein low voltages are output along a power supply line from a positive output of the low voltage power supply 104. Alternatively, a low voltage power system 104 may convert low voltages outside an enclosure to high voltages inside of the enclosure, for instance a circuit receiving energy from a SELV source and transmitting energy to storage elements working at high voltage. Within the following description, high voltage refers to voltages which are dangerous according to IEC safety regulations, and low voltage refers to safe voltages according to the current regulations. For example, a high voltage may be a DC voltage greater than 1500V and AC voltage greater than 1000 $V_{rms}$, a low voltage may be a DC voltage between 120-1500V and AC voltage between 50-1000$V_{rms}$, and an extra low voltage may be a DC voltage less than 120V and AC voltage less than 50$V_{rms}$.

An optional capacitor 106 is coupled between the positive output of the low voltage supply 104 and ground, providing a level of smoothing to the voltage supply for the subsequent circuitry.

Along the power supply line from the low voltage power supply 104, a certified fuse 108 is provided, wherein a first terminal of the fuse 108 is coupled to the output of the low voltage supply 104. In some examples, a certified fuse 108 may be used to meet IEC safety regulations and is generally available at low-cost. The fuse 108 is selected based on a current rating and a pulse energy rating. $I^2t$, with regard to the application of the system.

A plurality of voltage detection circuits 110, 112 are coupled along the power supply line between the second terminal of the fuse 108 and ground. The second terminal of the fuse 108 is coupled to the first voltage detection circuit 110 and second voltage detection circuit 112. Additionally, a first thyristor, specifically a Silicon-Controlled Rectifier, 120 is coupled between the second terminal of the fuse 108 and ground, and further coupled to the first voltage detection circuit 110. A second thyristor, specifically a SCR, 122 is coupled between the second terminal of the fuse 108 and ground, and further coupled to the second voltage detection circuit 112.

These components, including the high voltage system 102 and the low voltage power supply 104, are provided within an enclosure 114. The enclosure prevents a user from touching any high voltage nodes. In the event of a fault in the system wherein a high voltage is present on the supply line from the low voltage power supply 104, one or more of the plurality of voltage detection circuits 110, 112 will detect this high voltage and conduct a short circuit pathway via the associated SCRs 120, 122 to ground. Once current is flowing along this pathway, the increase in current will cause the fuse 108 to blow, breaking the circuit.

The supply line is further coupled from the plurality of voltage detection circuits 110, 112 to a SELV area 116. This SELV area 116 may be any user accessible system, which is positioned outside of the enclosure 114. In examples of the disclosure, the SELV area 116 may comprise a user interface 118.

In operation, the high voltage circuitry 102 within the enclosure 114 supplies potentially large, unsafe voltages. The high voltage circuitry 102 may be working at hazardous voltages, for example, at around 400V. This high voltage circuitry 102 is coupled to a low voltage supply 104, which converts any supplied high voltages into a desired, low supply voltage for providing power to the SELV circuit 116. Although the low power supply 104 runs at very low, safe voltage level, IEC regulations state that an inherently safe protection method should be provided, in case of any fault arising in the system that could result in high voltages present at low voltage areas. For example, a fault may induce a high voltage event on the output of the low voltage supply 104, which would be potentially dangerous to any user of the SELV circuitry 116.

The output of the enclosure 114 is coupled to the SELV area 116, wherein the enclosure 114 may be, for example, a metallic box or cover. The SELV circuits 116 outside of the enclosure 114 are accessible by a human, for example, by using a user interface 118 such as a front panel or keyboard. Therefore, the overall system 100 is set up such that, in order to transfer power to the SELV area 116, any voltage supply passes through a safety protection circuit 200, which comprises the fuse 108, the plurality of voltage detection circuits 110, 112, and the plurality of SCRs, 120, 122, before reaching the SELV area 116.

FIG. 2 illustrates an example of the safety protection device circuitry 200, comprised within the system detailed in FIG. 1. The safety protection circuit 200 comprises a fuse 108, a plurality of voltage detection circuits 110, 112, and a plurality of SCRs 120, 122, which are coupled between the power supply line and ground. The voltage detection circuits 110, 112, may be any circuits which, upon detection of a high voltage event above a set threshold, are designed to cause the associated SCR to conduct upon detection of a high voltage event. Example voltage detection circuits are described in the subsequent paragraphs.

The first voltage detection circuit 110 is coupled between a second terminal of the fuse 108 and ground. It comprises a voltage divider 202, coupled between the supply line and ground, wherein the voltage divider 202 is coupled in parallel to a zener diode 204 and a load 206. The zener diode 204 is positioned such that a first terminal of the zener diode 204 is coupled to the power supply line, and a second terminal of the zener diode 204 is coupled through a load 206 to ground. The voltage output of the voltage divider 202 is connected to a third terminal of the zener diode 204, which provides an adjustable reference voltage. The gate of the first SCR 120 is coupled to the second terminal of the zener diode 204, wherein the first SCR 120 is coupled between the second terminal of the fuse 108 and ground.

The second voltage detection circuit 112 is coupled on the power supply line between the second terminal of a fuse 108 and ground. The second voltage detection circuit 112 features the same components of the first detection circuit 110; that is; it comprises a second voltage divider 210, which is coupled in parallel to a second zener diode 212 and a second load 214. The second zener diode 212 is positioned such that a first terminal of the second zener diode 212 is coupled to the power supply line, and a second terminal of the second zener diode 212 is coupled through a second load 214 to ground. The voltage output of the second voltage divider 210 is connected to a third terminal of the second zener diode 212, which provides an adjustable reference voltage. The gate of the second SCR 122 is coupled to the second terminal of the second zener diode 212, wherein the second SCR 122 is coupled between the second terminal of the fuse 108 and ground.

In detailed operation, the above-described safety protection circuitry 200 protects the user of the SELV area 116 from any increase in the supplied voltage, in the event of a fault within the generated supply from low voltage power supply 104. In the event that the low voltage supply 104 develops a fault which causes a high voltage to be present on the output of the low voltage power supply 104, a large increase in the voltage may be detected at a point within the circuit, for example, at point A. This increase in voltage may be initially limited by maximum current capacity of the low voltage circuitry 104.

In operation, the high voltage event will be prevented from travelling to the SELV area 116 by the safety protection circuit 200.

The safety protection device 200 works as follows. In the event of a high voltage event, the increase in voltage will be detected by the first voltage detection circuit 110. The high voltage event will travel to the voltage divider 202, and if the voltage meets the set threshold voltage for the zener diode 204, the zener diode 204 will breakdown and conduct. This will allow the current to flow along the connection from the zener diode 204 to the gate of the first thyristor 120, which will then activate. Upon activation, the SCR 120 will conduct the excess of current and will effectively short-circuit the low voltage supply line to ground. Once current is flowing in this short circuit pathway, sufficient current will travel through the circuit to blow the fuse 108.

As the disclosed system 100 is designed to be fault tolerant, therefore a second voltage detection circuit 112 is provided, in the event of a fault within a component of the first detection circuit 110. If a high voltage event is detected at the voltage divider 208 of the second voltage detection circuit 112, and the increase in voltage meets the threshold voltage for the second zener diode 212, then the zener diode 212 will breakdown and conduct. Current will consequently flow along the connection from the zener diode 212 to the gate of the second SCR 122, which will activate, and effectively short circuit the low voltage supply line to ground. Therefore, the SELV area 116 is protected from any high voltage event by the plurality of voltage detection circuits 110, 112.

Additionally, each of the SCRs 120, 122 are selected such as their single pulse energy rating is higher than the pulse energy rating of the fuse 108. Consequently, the fuse 108 will break the circuit before any damage may occur to either of the SCRs 120, 122. In application, however, the fuse may not be a replaceable component, and any blowing of the fuse would cause a permanent failure of the system. Therefore, an electronic current protector may be coupled in series with the fuse 108, wherein a first terminal of the electronic circuit protector is coupled along the power supply line from the low voltage power supply 104, and the second terminal of the electronic current protector is coupled to the fuse 108. The electronic current protector has a pulse energy rating lower than that of the fuse, 108, and is designed to trip before the fuse 108 blows, protecting the fuse 108.

Alternative examples of the system 100 may comprise more than two voltage detection circuits. For example, an additional voltage detection circuit may be coupled between the second terminal of the fuse 108 and ground. The plurality of voltage detection circuits will be contained within the enclosure 114, and may provide additional fault protection for the SELV area 116.

As stated, the described voltage detection circuits 110, 112 represent one example of voltage detection circuits, which may have many possible designs. In theory, any voltage detection circuit is acceptable, providing that when the voltage at the input node of the voltage detection circuit is above a set threshold, the circuit is designed to cause the associated SCR to conduct. For example, in a minor variation to the described circuits 110, 112, capacitors may be added between the output of the circuit and ground. Additionally, or alternatively, a zener diode is one of a number of possible components which may be coupled to the gate of the associated SCR.

Additionally, or alternatively, each of the voltage detection circuits 110, 112 may comprise different components. For example, these components may be made by different manufacturers, or made of different materials. This provides additional fault protection in the unlikely event of a substandard batch of components.

A further alternative example of the system 100 may comprise the use of additional capacitors, to reduce the likelihood of any accidental triggering of either of the SCRs 120, 122 by minor increases in voltage, i.e. noise. For example, an additional capacitor may be coupled across the first load 206, the first terminal of the capacitor having a coupled to the output from the zener diode 204, and the second terminal of the capacitor connected to ground. In addition to, or instead of this capacitor, a capacitor may be placed across the second load 214 in the second voltage detection circuit 216. These examples may provide additional protection against unintentional SCR activation.

As detailed above, examples of the disclosure provide an enclosed system 100, which comprises a high voltage circuitry 102 coupled to a low voltage supply 104, which converts high voltages to low voltages within an enclosure (or vice versa), a certified fuse 108 and a plurality of the above-described voltage detection circuits 110, 112, and a plurality of SCRs 120, 122, coupled along a supply line from the low power supply 104, to provide power along a wired connection from the high voltage system 102 to a SELV area 116 even in the case of single component failure.

All of the circuitry in the safety protection circuit 200 is replicated in order to ensure it is single-fault tolerant. Therefore, by comprising all of the noted elements, the whole system 100 may be classed as safe, which from the regulatory point of view includes the case of single failure, even without the need for galvanic isolation.

Consequently, where the use of certified components within isolation solutions, such as power transformers, opto couplers or capacitive barriers, for example, may result in significantly increased costs for providing the desired safety protection, the present disclosure may remove the need for these expensive, certified components.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A safety protection circuit comprising:
   a fuse, a first terminal of the fuse coupled to a power supply line from the output of a power supply;
   a first voltage detection circuit, coupled between a second terminal of the fuse and ground;
   a first Silicon-Controlled Rectifier, SCR, coupled between the power supply line and ground, wherein the first SCR is triggered upon detection of a threshold voltage by the first voltage detection circuit;
   a second voltage detection circuit, coupled between the second terminal of the fuse and ground; and
   a second SCR, coupled between the power supply line and ground, wherein the second SCR is triggered upon detection of a threshold voltage by the second voltage detection circuit, wherein the first and second voltage detection circuit comprise:
   a voltage divider;
   a zener diode, wherein a first terminal of the zener diode is coupled to the power supply line; and
   a load, wherein a second terminal of the zener diode is coupled through the load to ground, wherein the output of the voltage divider is connected to an adjustable reference terminal of the zener diode, wherein a gate terminal of the SCR associated with the voltage detection circuit is coupled to the second terminal of the zener diode.

2. The safety protection circuit of claim 1, wherein the power supply line is provided from a low voltage power supply, and wherein the low voltage power supply is supplied from a high voltage system.

3. A safety protection circuit comprising:
   a fuse, a first terminal of the fuse coupled to a power supply line from the output of a power supply;
   a first voltage detection circuit, coupled between a second terminal of the fuse and ground;
   a first Silicon-Controlled Rectifier, SCR, coupled between the power supply line and ground, wherein the first SCR is triggered upon detection of a threshold voltage by the first voltage detection circuit;
   a second voltage detection circuit, coupled between the second terminal of the fuse and ground;
   a second SCR, coupled between the power supply line and ground, wherein the second SCR is triggered upon detection of a threshold voltage by the second voltage detection circuit; and an electronic circuit protector, a first terminal of the electronic circuit protector coupled along the power supply line, and a second terminal of the electronic circuit protector coupled to the first terminal of the fuse, wherein the pulse energy rating of the electronic circuit protector is lower than the pulse energy rating of the fuse.

4. The safety protection circuit of claim 2, wherein a capacitor is coupled in parallel to a low voltage power supply, the capacitor coupled between the supply line and ground.

5. A safety protection circuit comprising:
a fuse, a first terminal of the fuse coupled to a power supply line from the output of a power supply;
a first voltage detection circuit, coupled between a second terminal of the fuse and ground;
a first Silicon-Controlled Rectifier, SCR, coupled between the power supply line and ground, wherein the first SCR is triggered upon detection of a threshold voltage by the first voltage detection circuit;
a second voltage detection circuit, coupled between the second terminal of the fuse and ground; and
a second SCR, coupled between the power supply line and ground, wherein the second SCR is triggered upon detection of a threshold voltage by the second voltage detection circuit, wherein the single pulse energy rating of each of the first and second SCRs is selected to be higher than the pulse energy rating of the fuse.

6. The safety protection circuit of claim 3 wherein the safety protection circuit, high voltage system and low voltage power supply are contained within an enclosure.

7. The safety protection circuit of claim 6, wherein the output of the enclosure is coupled to a safety low voltage area outside of the enclosure.

8. The safety protection circuit of claim 7, wherein the safety low voltage area comprises a user interface.

9. A safety protection circuit comprising:
a first circuit to detect a voltage, coupled between a power supply line from the output of a power supply and ground;

a first switchable conduction path configured to conduct based on an output from the first circuit indicating detection of a predetermined voltage, coupled between the power supply line and ground;
a second circuit to detect a voltage, coupled between the power supply line and ground;
a second switchable conduction path configured to conduct based on an output from the second circuit indicating detection of a predetermined voltage, coupled between the power supply line and ground; and
a fuse, the first terminal of the fuse coupled to the output of the power supply and a second terminal of the fuse coupled to the first circuit for detecting a voltage, wherein a pulse energy rating of each of the first and second switchable conduction paths are selected to be higher than a pulse energy rating of the fuse.

10. A safety protection circuit comprising:
a first circuit to detect a voltage, coupled between a power supply line from the output of a power supply and ground;
a first switchable conduction path configured to conduct based on an output from the first circuit indicating detection of a predetermined voltage, coupled between the power supply line and ground;
a second circuit to detect a voltage, coupled between the power supply line and ground; and
a second switchable conduction path configured to conduct based on an output from the second circuit indicating detection of a predetermined voltage, coupled between the power supply line and ground, wherein the power supply line is provided from a low voltage power supply, and wherein the low voltage power supply is supplied from a high voltage system, wherein the safety protection circuit, high voltage system and low voltage power supply are contained within an enclosure, and wherein the output of the enclosure is coupled to a safety low voltage area outside of the enclosure.

* * * * *